US009120227B2

(12) United States Patent
Zheng et al.

(10) Patent No.: US 9,120,227 B2
(45) Date of Patent: Sep. 1, 2015

(54) HUMAN MOTION TRACKING CONTROL WITH STRICT CONTACT FORCE CONSTRAINTS FOR FLOATING-BASE HUMANOID ROBOTS

(71) Applicants: Yu Zheng, Pittsburgh, PA (US); Katsu Yumane, Pittsburgh, PA (US)

(72) Inventors: Yu Zheng, Pittsburgh, PA (US); Katsu Yumane, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 115 days.

(21) Appl. No.: 14/067,603

(22) Filed: Oct. 30, 2013

(65) Prior Publication Data
US 2015/0051734 A1    Feb. 19, 2015

Related U.S. Application Data

(60) Provisional application No. 61/866,382, filed on Aug. 15, 2013.

(51) Int. Cl.
| | |
|---|---|
| B25J 5/00 | (2006.01) |
| B25J 19/02 | (2006.01) |
| G05B 15/00 | (2006.01) |
| G05B 19/00 | (2006.01) |
| B25J 9/16 | (2006.01) |

(52) U.S. Cl.
CPC .............. *B25J 9/1633* (2013.01); *Y10S 901/01* (2013.01)

(58) Field of Classification Search
USPC .......... 700/261, 260, 262, 254, 245; 901/1, 2, 901/28, 46, 48; 318/568.1, 568.11, 568.12, 318/434, 568.16, 568.17, 567
See application file for complete search history.

(56) References Cited

U.S. PATENT DOCUMENTS

| | | | | |
|---|---|---|---|---|
| 5,767,648 | A * | 6/1998 | Morel et al. | 318/568.1 |
| 8,870,967 | B2 * | 10/2014 | Herr et al. | 623/24 |
| 2004/0169484 | A1 * | 9/2004 | Iribe et al. | 318/568.11 |
| 2005/0055131 | A1 * | 3/2005 | Mikami et al. | 700/245 |
| 2005/0179416 | A1 * | 8/2005 | Iribe et al. | 318/563 |
| 2005/0184697 | A1 * | 8/2005 | Iribe et al. | 318/568.12 |
| 2009/0105878 | A1 * | 4/2009 | Nagasaka | 700/245 |
| 2013/0131865 | A1 * | 5/2013 | Yamane | 700/254 |
| 2015/0005941 | A1 * | 1/2015 | Milenkovic | 700/262 |

* cited by examiner

*Primary Examiner* — Ronnie Mancho
(74) *Attorney, Agent, or Firm* — Marsh Fischmann & Breyfogle LLP; Kent A Lembke

(57) ABSTRACT

A controller for floating-base humanoid robots that can track motion capture data while maintaining balance. Briefly, the controller includes a proportional-derivative (PD) controller that is adapted to compute the desired acceleration to track a given reference trajectory at every degree-of-freedom (DOF) of the robot including the six unactuated ones of the floating base. Second, the controller includes a component (joint torque optimization module) that computes the optimal joint torques and contact forces to realize the desired accelerations given by the first component (i.e., the PD controller). The joint torque optimization module performs this computation considering the full-body dynamics of the robot and the constraints on contact forces. The desired accelerations may not be feasible for the robot due to limits in normal contact forces and friction (e.g., the robot sometimes cannot exactly copy or perform the modeled human motion defined by motion capture data).

23 Claims, 6 Drawing Sheets

HUMAN MOTION TRACKING CONTROL WITH STRICT CONTACT FORCE CONSTRAINTS FOR FLOATING-BASE HUMANOID ROBOTS

CROSS-REFERENCE TO RELATED APPLICATIONS

This application claims the benefit of U.S. Provisional Application No. 61/866,382, filed Aug. 15, 2013, which is incorporated herein by reference in its entirety.

BACKGROUND

1. Field of the Description

The present description relates, in general, to legged robots (e.g., biped humanoid robots or other legged robots such as quadrupeds) that may be implemented as floating-base humanoid robots (e.g., with no link or attachment to a support) and to control of force-controlled joints of such robots. More particularly, the present description relates to methods for controlling floating-base humanoid robots considering strict contact force constraints (and to robots operating with a controller implementing such control methods).

2. Relevant Background

A biped humanoid robot is a robot with a structure similar to that of the human body. Humanoid robots have been designed for providing interaction with various environments such as tools and machines that were made for humans and often are adapted for safely and effectively interacting with human beings. In general, humanoid robots have a torso with a head, two arms, and two legs each with some form of foot such that the robot can walk on planar surfaces, climb steps, and so on (e.g., these humanoid robots are "bipeds" as are humans). Humanoid robots may be formed with many rigid links that are interconnected by joints that are operated or positioned by applying a force or torque to each joint to move and position a robot. Similarly, other legged robots such as those with three, four, or more legs also may walk utilizing force-controlled movement of their legs.

In order to interact with human environments, humanoid robots require safe and compliant control of the force-controlled joints. In this regard, a controller is provided for each robot that has to be programmed to determine desired motions and output forces (contact forces) and, in response, to output joint torques to effectively control movement and positioning of the humanoid robot. However, it has often proven difficult to achieve desired results with force-controlled robots because while performing a task in a complex environment the robot may encounter uneven ground, static and dynamic obstacles, and even humans. The robot has to continue to be balanced as it stands in one location and also as it steps and moves within the environment. Humanoid robots are expected by many to work with humans in home and office environments. Hence, it would be more desirable for such robots to have human-like motions so that human co-workers can easily infer the robot's intentions and predict future movements for safe and smooth interactions.

However, programming of controllers and control methods for humanoid robots has not proven to be straightforward because the robots tend to have complex structures made up of many joints. One approach to addressing this control problem is to try to teach the motions to the robots through human demonstration, which is often referred to as learning from demonstration or imitation learning. This approach allows a programmer to simply demonstrate the motion with a human actor or model while the robot observes the motion. A learning algorithm takes the observed motions of the human actor and then makes adjustments to the motion so that the robot can achieve the task using its own body (with its joints, drivers/actuators, and the like).

Unfortunately, most of the work based on this training approach has only considered the kinematics of motions and, therefore, cannot be directly applied to robots and motions that require balancing. In other words, these human motion tracking approaches are not directly useful for controlling robots, such as floating-base humanoid robots, to stand or to walk because these motions require balancing over a support surface (e.g., the ground over which the robot is walking while being controlled).

SUMMARY

The inventors recognized that there was a need for improved methods for controlling humanoid robots. Further, the inventors understood that the control methods should consider the dynamics in such motions. The six degrees of freedom (DOF) of the translation and rotation of the floating base are not directly actuated, but, instead, the corresponding force and moment are provided by contact forces that are subject to inequality constraints on the friction.

The present description presents and teaches a controller for floating-base humanoid robots that can track motion capture data while maintaining balance. Unlike prior work with similar goals, the controller does not include a balance controller based merely on simplified models. Briefly, the controller, which may be labeled a human motion tracking controller, includes two main components. First, the controller includes a proportional-derivative (PD) controller that is adapted to compute the desired acceleration to track a given reference trajectory at every DOF of the robot including, in some cases, the six unactuated ones of the floating base.

Second, and more significant to the present description, the controller includes a component (joint torque optimization module) that computes the optimal joint torques and contact forces to realize the desired accelerations given by the first component (i.e., the PD controller). The joint torque optimization module or second component performs this computation considering the full-body dynamics of the robot and the constraints on contact forces. The desired accelerations may not be feasible for the robot due to limits in normal contact forces and friction (e.g., the robot sometimes cannot exactly copy or perform the modeled human motion defined by motion capture data, which may be from motion capture equipment or even from animation or other sources/inputs).

With this possible limitation or issue in mind, the inventors decoupled the optimization problem into two simpler sub-problems (a contact wrench computation and a joint torque computation performed by the joint torque optimization module or second component of the controller) by taking advantage of the property that the joint torques do not contribute to the six DOFs of the floating base. This allows the optimization to be solved in real time subject to the strict contact force constraints.

The usefulness of the tracking controller is demonstrated in full-body dynamics simulation with two settings. In the first setting, a humanoid robot was controlled to track choreographic human motions while maintaining both feet on the ground (while the feet in the motion capture data were not perfectly still due to errors in motion capturing and differences between the kinematics of the human subject and the robot). In the second setting, the robot was controlled so as to follow human stepping motions where the two feet were alternately lifted up and touched down. In these cases, the robot was shown to be able to successfully track the motion capture data by using the tracking controller described herein.

More particularly, a method is provided for controlling movement of a floating-base robot. The method includes sensing a state of a floating-base robot with reference to an operating environment (e.g., rough or planar terrain). The method also includes determining desired joint and contact link accelerations based on the set of reference motions and the state of the floating-base robot. Then, the method includes generating a set of joint torques to control the floating-base robot to track the set of reference motions. In practice, the method includes repeating the sensing of the state, the determining of desired joint and contact link accelerations, and the generating a set of joint torques for each control cycle for the floating-base robot.

Preferably, the method includes computing contact wrenches to move the floating-base robot to the next desired contact state. In fact, the step of generating the set of joint torques is typically performed using the contact wrenches as input. The contact wrenches are calculated based on limitations on contact forces for the floating-base robot. In some cases, the limitations include limits of friction at each contact point for the floating-base robot. In these and other cases, the limitations include limits on directions of forces applied by the environment on each contact point, whereby, for example, the environment (or ground) does not pull on the floating-base robot.

DETAILED DESCRIPTION OF THE PREFERRED EMBODIMENTS

Figure 1:
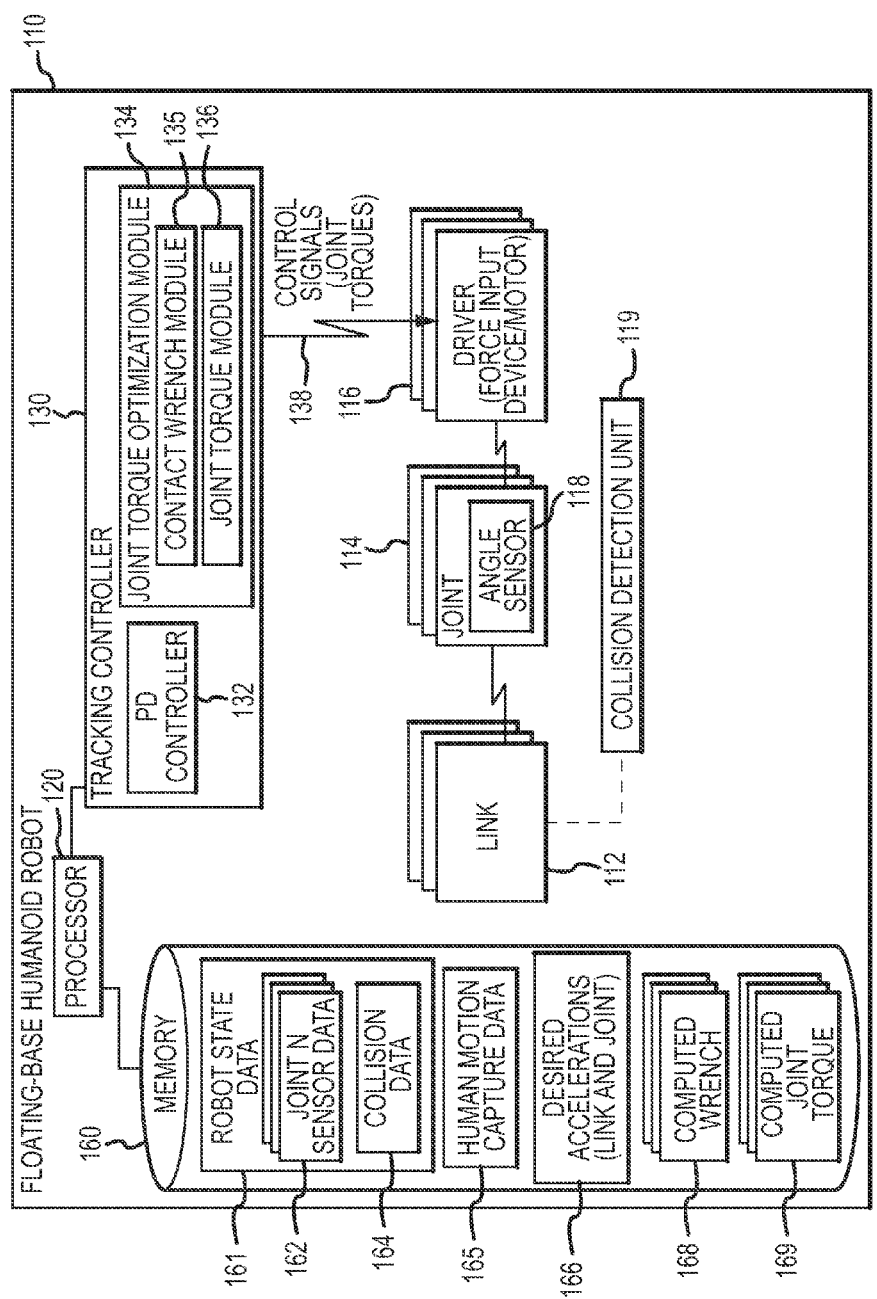
FIG. 1 is a functional block diagram of a floating-base humanoid robot including software or computer code that may be run to control the robot based on human motion capture data.

Briefly, the present description is directed toward a human motion tracking controller as well as to a control method used to control a robot and to a robot with such a controller controlling its balanced movements. The controller (or tracking controller) is adapted to allow free-standing humanoid robots to track given or input motions, such as motions defined by human motion capture data (which may include key frame animation and other sources of human motion data).

One difficulty that was overcome or addressed in designing the tracking controller was that the given/input motion may not be feasible for a particular robot or in a particular environment or point in time, and, without the controller design described herein, the robot may fall down if it simply tries to fully track the motion with a naïve feedback controller. For example, while the captured human motion is feasible for the human subject/model providing the human capture data, the same motion may not be feasible for the robot because of the differences in the kinematics and dynamics of the particular floating-base humanoid robot with its particular design and arrangement of components including force or torque-drive joints. Also, key frame animations are usually created without considering the dynamics of a robot, and, therefore, their use as human motion capture data input to a controller has been problematic for prior controllers as certain motions simply are not possible to perform by particular physical robots.

The following description teaches a tracking controller for use with humanoid robots that can track motion capture data while maintaining the balance of the controlled robot. The controller includes two main components: (1) a component that computes the desired acceleration at each degree of freedom (DOF) using, for example, a standard proportional-derivative (PD) controller; and (2) a component that computes the optimal joint torques and contact forces to realize the desired accelerations, from the first component, considering the full-body dynamics of the robot and the limits in contact forces as well as the constraints on contact link motions. By taking advantage of the fact that the joint torques do not contribute to the six DOFs of the robot's foot, the tracking controller has been designed to decouple the optimization into two simpler sub-problems that can be solved in real time (e.g., for real time control over the robot with the controller issuing torque values to each driver of each joint of the robot).

One potential technique for enhancing the stability while controlling a robot is to run multiple tracking controllers at the same time and then to choose one of the controllers to determine the final control input. In addition to the controller that attempts to track the given reference motion (defined by the motion capture data input to the tracking controller), the tracking controller (or controller assembly) may include another instance of the controller run with a fixed static equilibrium pose as the reference. Then, the tracking controller assembly can choose the actual input to the robot depending on how close the robot is to losing its balance. In other words, the controller with the fixed reference can be used (or act to take over control) when the robot is determined to be about to lose balance so as to safely stop the robot at a static equilibrium pose (e.g., controlled to not perform or track motions that would cause it to fall or lose balance).

FIG. 1 is a functional block diagram of a floating-base humanoid robot 110 including software or computer code (e.g., tracking controller 130) that may be run (e.g., by processor 120) to control the robot 110 based on human motion capture data 165 stored in memory 160 (onboard or wirelessly accessed by the controller 130). The motion capture data 165 may be obtained from nearly any source such as conventional motion capture devices used to track motion of a human model/actor or from animation (e.g., keyframe animation as desired motion input), and the human motion capture data 165 is provided as input to a tracking controller 130 to define a desired set of movements for the robot 110 (e.g., the controller 130 acts to try to track the movements defined by data 165).

Generally, the tracking control methods described herein may be used with nearly any floating-base humanoid robot 110 that is a force-controlled robot that can be freely moved (not connected to a support) such as by moving its leg or other joints. As shown, the robot 110 includes a number of rigid links 112 that are joined or interconnected and movable with joints 114. The links 112 may be moved and positioned by operating a driver 116 (e.g., a force input device such as motor, an actuator, or the like) to apply a joint torque on the joint 114 in response to control signals (joint torques) 138 received from a robot controller or tracking controller 130 run by processor 120.

Angle sensors 118 are provided at each joint 114 to output data or measurements indicative of an angle at the joint 114, and the joint angle measurement or sensor data 162 is stored in memory 160 of the robot 110 as part of the robot state data 161 (which is used as input by the tracking controller 130 to define desired accelerations 166 and strict contact constraints). The links 112 may include a pair of feet with soles, and, during tracking control by controller 130, these links 112 are not constrained to be flat on a floor or other planar support platform or over uneven or nonplanar terrain/support surfaces.

The robot 110 includes a processor or CPU 120 that operates to manage the memory 160 (e.g., store and retrieve data in digital form) and to run one or more programs (non-transitory computer readable medium). For example, the processor 120 runs a tracking controller 130 to control operations of the robot 110 including outputting control signals or joint torques 138. The torques 138 are generated by the controller 130 based on desired accelerations (for contact links and joints) 166 computed by a PD controller 132 and further based on the output of a joint torque optimization module 134. The module 134 is made up of: (1) a contact wrench module 135 adapted to compute wrenches 168 based on the desired accelerations 166 (output of PD controller 132), based on the actual robot state data 161 and based on the desired contact state from human motion capture data 165 and (2) a joint torque module 136 computing joint torques 169 based on the desired accelerations 166, based on the computed wrenches 168 from the module 135, and based on actual state data 161.

The form of the robot controller 130 is not limiting of the invention as long as the controller 130 utilizes at least portions of the outputs of the two components 135, 136 (decoupled optimizers as described herein) of the tracking module 134 to generate the joint torques 138. In some embodiments, a computer outside of the robot 110 is utilized to generate portions of the data shown stored in memory 160 with this data being communicated (e.g., wirelessly) to the controller 130 for use in generating the control signals 138 transmitted to the drivers 116 to move the robot 110.

With the human motion tracking method and a robot 110 using such control methods generally understood, it may be useful to provide more detail on methods and experimental results regarding the use of this control method for controlling floating-base humanoid robots with emphasis on consideration of strict contact force constraints. The following first describes basic equations used in this control method and then moves onto exemplary motion control followed by simulation results showing the effectiveness of the tracking control method.

If the robot has $N_J$ actuated joints, the total DOF of the robot is $N_G=N_J+6$ including the six unactuated DOF of the translation and rotation of the floating base. One can let $q \in \mathbb{R}^{N_G}$ denote the generalized coordinate that defines the robot configuration and assume that its first six components correspond to the translation and rotation of the floating base. Also, one can let $N_C$ denote the number of links in contact with the environment and let $w_i \in \mathbb{R}^6$ (i=1, 2, ..., $N_C$) denote the contact wrench (force and moment) applied to the i-th contact link by the environment.

Then, the equation of motion of the robot can be written as:

$$M\ddot{q}+c=N^T\tau+J^T w \quad \text{Eq. (1)}$$

where $M \in \mathbb{R}^{N_G \times N_G}$ is the joint-space inertia matrix of the robot, $c \in \mathbb{R}^{N_G}$ is the sum of Coriolis, centrifugal, and gravity forces, and $w = [w_1^T \ w_2^T \ \ldots \ w_{N_c}^T]^T \in \mathbb{R}^{6N_C}$. Matrix $N \in \mathbb{R}^{N_J \times N_G}$ maps the joint torques into the generalized forces. Since the floating base is unactuated, N has the form:

$$N=[0_{N_J \times 6} \ I_{N_J \times N_J}] \quad \text{Eq. (2)}$$

Matrix $J \in \mathbb{R}^{6N_C \times N_G}$ is the contact Jacobian matrix whose transpose maps the contact wrenches into the generalized forces and has the form:

$$J=[J_1^T \ J_2^T \ \ldots \ J_{N_c}^T]^T \quad \text{Eq. (3)}$$

where $J_i \in \mathbb{R}^{6 \times N_G}$ is the Jacobian matrix of the i-th contact link's position and orientation with respect to the generalized coordinates. Then, one can let $\dot{r}_i \in \mathbb{R}^6$ denote the linear and angular velocities of the i-th contact link and $\ddot{r}_i$ the accelerations. Then, the relationship between $\dot{r}_i$ and the generalized velocity $\dot{q}$ can be written as:

$$\dot{r}_i=J_i\dot{q} \quad \text{Eq. (4)}$$

Then, differentiating Eq. (4) produces the relationship between the joint and Cartesian accelerations as:

$$\ddot{r}_i=J_i\ddot{q}+\dot{J}_i\dot{q} \quad \text{Eq. (5)}$$

Figure 2:
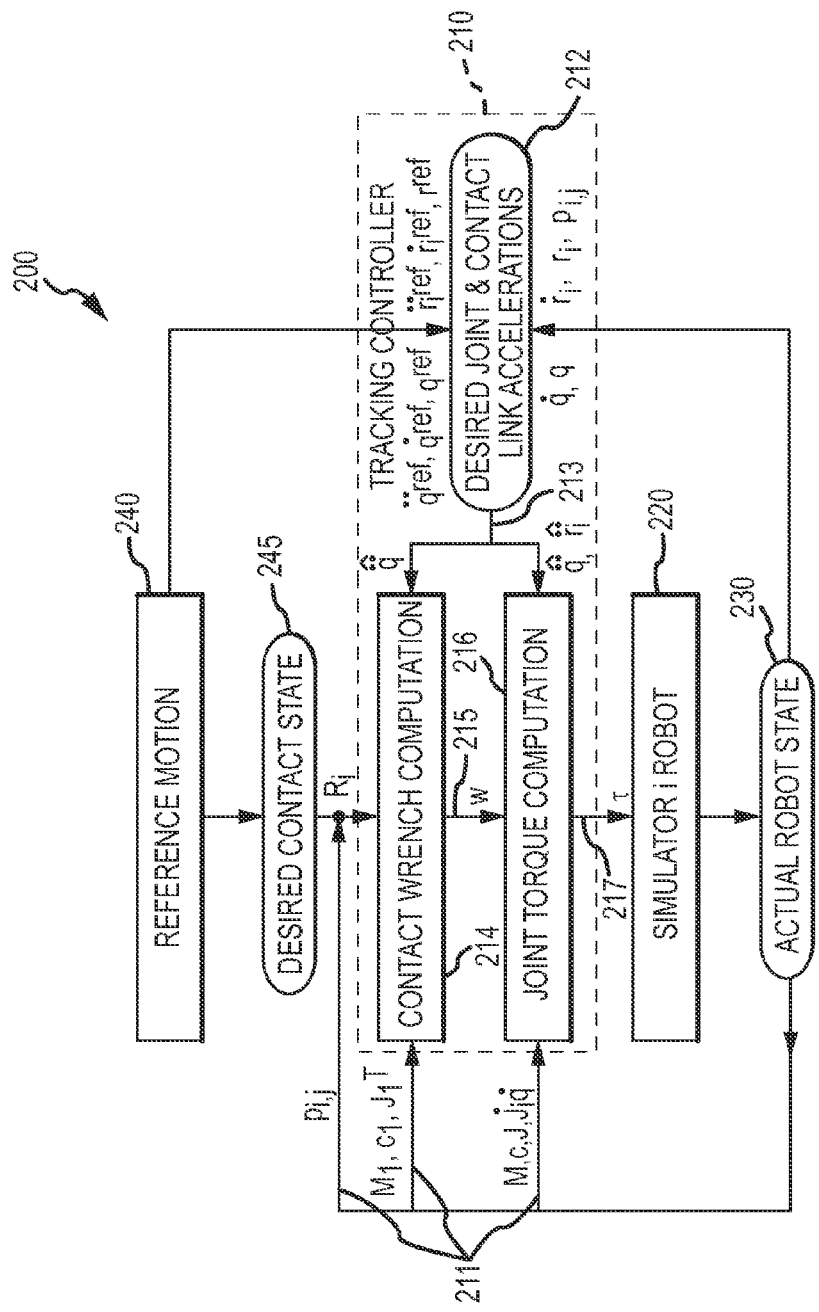
FIG. 2 illustrates a control method, with a data flow diagram, as may be carried out by operation of tracking controller of the present description.

Now, with these supporting or basic equations in mind, the description or discussion can turn to an overview of motion tracking control (e.g., as it may be implemented by or during operation of the robot 110 of FIG. 1). FIG. 2 shows a data flow diagram 200 providing an overview of operation of a motion tracking controller 210. The tracking controller 210 includes an initial step 212 (e.g., as performed by a PD controller or the like) and, more importantly, includes two main steps performed at 214 (contact wrench computation) and at 216 (joint torque computation).

The PD controller step 212 produces desired joint and contact link accelerations by processing the reference motion 240 (e.g., input data including the motion capture data) and the actual robot state data (the state may be determined at 230 and include determined normals, collision detections, and the like such as to provide information as to where links and other portions of the robot are presently located in an environment, e.g., where the feet are located relative to the support surfaces/terrain).

Further, within the controller 210, the step performed at 214 involves computation of the contact wrenches 215 via the computation of contact forces that satisfy the friction constraint and that realize the desired reference motion of the floating base as much as possible (based on the desired contact state 245 from the motion capture data 240 (e.g., use the same contact state 245 as a human subject/actor when the motion 240 was recorded)). In other words, the contact points are determined using the desired contact state 245 from the reference motion 240 and the current contact link positions of the actual robot as shown as input at 211 from state data collection step 230. Since the robot may not be able to perform some of the reference motions 240, the control method 200 may involve, in some embodiments, determining at each link desired contact states 245 (achievable contact states rather than taking these from the motion data 240). Based on the computed contact wrenches 215, the step performed by the controller 210 at 216 determines the joint torques 217 that will realize all joint motions and especially the desired contact link motion, and the torques 217 are passed in control signals to the simulator/robot 220 to control its movements.

At this point, it may be useful to discuss in more detail an exemplary formulation of contact wrenches. For a given reference motion, the set of contact candidate links can be identified that includes the links that may be in contact with the environment during the motion. The set typically is made up of both feet of the robot. At any time during the motion, a contact candidate link has one of the following contact states: face contact; edge contact; point contact; or no contact.

Figure 3:
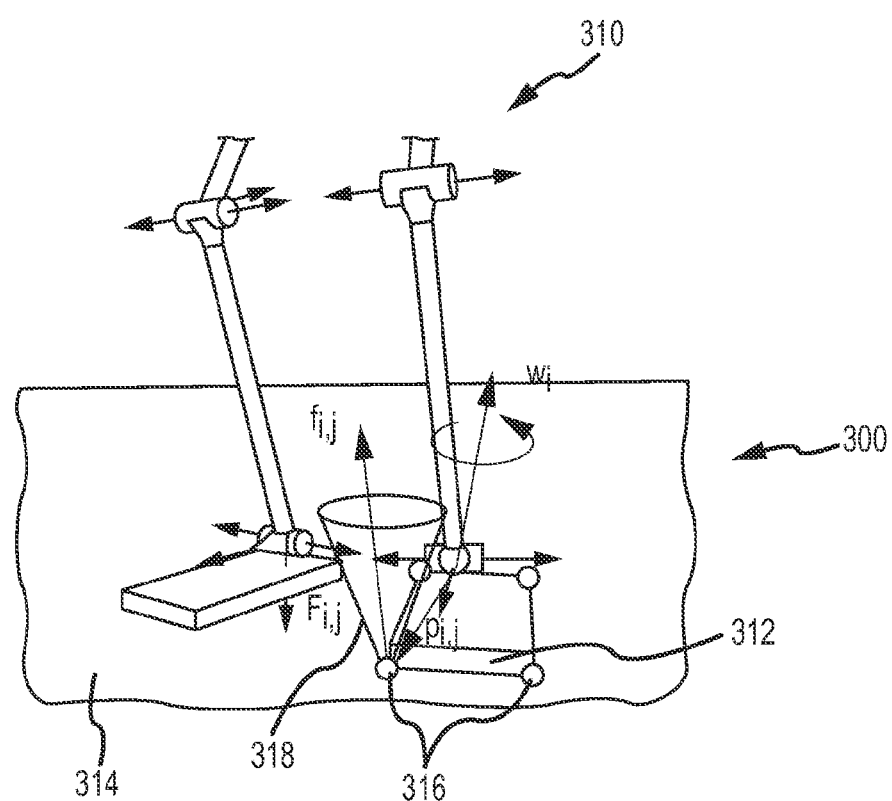
FIG. 3 is a diagram illustrating contact wrench applied to a contact link (e.g., a robot's foot) and contact forces from the environment (e.g., terrain or ground over which the robot is walking during controlled movement to track human motion capture data)

FIG. 3 provides a diagram 300 for a portion of a floating-base humanoid robot 310 that illustrates the relationship between the contact wrench applied to a contact link 312 and the contact forces from the environment (support surface/terrain 314). The dots 316 represent contact points (e.g., multiple contact points) while the cone 318 is used to show limits on contact force values (e.g., feasible contact forces for a controlled robot 310 through consideration of all contact points 316).

With FIG. 3 in mind, one can let $p_{i,j} \in \mathbb{R}^3 (j=1, 2, \ldots, N_i)$ be the vertices of the contact area between the i-th contact link and the environment and $f_{i,j} \in \mathbb{R}^3$ be the contact force at the j-th contact vertex. The number of contact vertices, $N_i$, is 0, 1, 2, or greater than or equal to 3 in no, point, edge, and face contact states, respectively. The contacts can be assumed to be rigid subject to Coulomb friction model. Therefore, $f_{i,j}$ is a pure force and can be decomposed into three components, $f_{i,j1}, f_{i,j2}, f_{i,j3}$, along the normal and two tangential vectors at the contact vertex. The wrench $w_i$ applied to the i-th contact link by the environment is the resultant force and moment from all contact forces, $f_{i,j}$ (j=1, 2, \ldots, N_i), and can be written as:

$$w_i = \Sigma_{j=1}^{N_i} R_{i,j} f_{i,j} = R_i f_i \qquad \text{Eq. (6)}$$

where $R_i = [R_{i,1} \; R_{i,2} \; \ldots \; R_{i,N_i}] \in \mathbb{R}^{6 \times 3N_i}$, $= f_i [f_{i,1}^T \; f_{i,2}^T \; \ldots \; f_{i,N_i}^T]^T \in \mathbb{R}^{3N_i}$, and $R_{i,j} \in \mathbb{R}^{6 \times 3}$ is the matrix that maps $f_{i,j}$ into the force and moment around the local frame of the i-th contact link in which $w_i$ is expressed. Here, slipping contact is not considered, so each contact force $f_{i,j}$ must satisfy the friction constraint given by the following (which limits contact forces received by (at each contact point) ensuring the ground cannot pull feet and by enforcing limits of friction):

$$F_{i,j} = \{ f_{i,j} \in \mathbb{R}^3 | f_{i,j1} \geq 0, \sqrt{f_{i,j2}^2 + f_{i,j3}^2} \leq \mu f_{i,j1} \}. \qquad \text{Eq. (7)}$$

The controller uses the contact vertex positions and the contact states to compute $R_i$. The actual contact vertex positions and states may be different from those in reference motion. In one exemplary implementation, the inventors used the actual contact vertex positions to compute feasible contact forces at the current pose, while using the contact states in the reference motion for the reason illustrated by the following example. Consider a case where the right foot is about to touch down. If the actual contact state is used, the optimized center of pressure (COP) will stay in the left foot, and, therefore, the right foot may not touch down unless the position tracking is perfect. If the contact state in the reference motion is used on the other hand, the optimized COP will leave the left foot, which forces the right foot to touch down.

With regard to desired joint and contact accelerations (which may be determined by a PD controller or the like, the desired accelerations of joints are calculated based on the reference and current positions (tracked motion and present robot state) and velocities as well as the reference accelerations as:

$$\ddot{q} = \ddot{q}^{ref} + k_d(\dot{q}^{ref} - \dot{q}) + k_p(q^{ref} - q) \qquad \text{Eq. (8)}$$

where q, $\dot{q}$ are the current joint angle and velocity, $q^{ref}$, $\dot{q}^{ref}$, $\ddot{q}^{ref}$ are the reference joint angle, velocity, and acceleration, and $k_p$, $k_d$ are proportional and derivative gains.

The desired acceleration of contact candidate link i, $\dot{\dot{r}}_i$ is determined depending on its desired contact state. If the desired contact state is face contact, $\dot{\dot{r}}_i = 0$. If the desired contact state is no contact, $\dot{\dot{r}}_i$ is determined using the same control law as $\ddot{q}$:

$$\dot{\dot{r}}_i = \dot{\dot{r}}_i^{ref} + k_{dc}(\dot{r}_i^{ref} - \dot{r}_i) + k_{pc}(r_i^{ref} - r_i) \qquad \text{Eq. (9)}$$

where $k_{pc}$ and $k_{dc}$ are the proportional and derivative gains.

If the desired contact state is edge or point contact, the temporary desired link acceleration $\dot{\dot{r}}_{i0}$ is computed by Eq. (9). Then, $\dot{\dot{r}}_{i0}$ is projected onto the subspace of link acceleration that satisfies the kinematic constraints of edge or point contact to obtain the desired link acceleration $\dot{\dot{r}}_{i0}$. If the contact link rotates around the edge, $\ddot{r}_i$ should have the form:

$$\ddot{r}_i \begin{bmatrix} [p_{i,1} \times](p_{i,1} - p_{i,2}) \\ p_{i1} - p_{i2} \end{bmatrix} \dot{\omega} \qquad \text{Eq. (10)}$$

where $[p_{i,1} \times] \in \mathbb{R}^{3 \times 3}$ is the skew-symmetric matrix representing the cross product of $p_{i,1}$ with another vector and $\dot{\omega} \in \mathbb{R}$ is the angular acceleration of the contact link about the edge. If the contact link rotates about a vertex, $\ddot{r}_i$ should have the form:

$$\ddot{r}_i = \begin{bmatrix} [p_{i,1} \times] \\ I_{3 \times 3} \end{bmatrix} \dot{\omega} \qquad \text{Eq. (11)}$$

where $\dot{\omega} \in \mathbb{R}^3$ consists of the angular accelerations about the vertex. Then, $\ddot{r}_{i0}$ is projected onto the subspace represented by either Eq. (10) or Eq. (11) depending on whether the desired contact state is edge or point to obtain $\ddot{r}_i$.

Now, with regard to optimizing the contact forces and the joint torques (as may be performed by the contact wrench module and joint torque module (decoupled optimization of these two problems)), the overall role of the tracking controller is to determine the joint torques such that the robot can replay a given reference motion that may or may not be physically feasible for the robot. In floating-base humanoid robots, the motion depends not only on the joint torques but, significantly, also the reaction contact forces from the environment, which are also affected by the joint torques. Furthermore, contact forces are subject to the nonlinear friction constraints described by Eq. (7). Solving for the contact forces and joint torques simultaneously is computationally expensive and not suitable for real-time control.

Hence, in the tracking controller described herein, solving for the contact forces is decoupled from solving for the joint torques by taking advantage of the property that the joint torques do not affect the motion of the floating base. The tracking controller, therefore, may be thought of as including two steps: (1) optimize the contact forces considering the friction constraints; and (2) optimize the joint torques considering the contact link acceleration constraint.

With regard to Step 1 or computing contact forces, the first six equations in the full-body motion equation, Eq. (1), describe the motion of the floating base. From Eq. (2), one can see that the six equations do not contain joint torques, which corresponds to the fact that the total linear and angular momenta are affected only by external forces. By extracting the first six equations, one can obtain:

$$M_1\ddot{q}+c_1=J_1^T w \qquad \text{Eq. (12)}$$

where $M_1 \in \mathbb{R}^{6\times N_G}$ and $J_1^T \in \mathbb{R}^{6\times 6N_C}$ consist of the first six rows M and $J^T$, respectively, and $c_1$ includes the first six components of c. Then, substituting Eq. (6) into Eq. (12) yields:

$$M_1\ddot{q}+c_1=Gf \qquad \text{Eq. (13)}$$

where $G=[G_1 \ G_2 \ \ldots \ G_{N_C}] \in \mathbb{R}^{6\times 3\Sigma_{i=1}^{N_c}N_i}$ with $G_i=J_{l_i}^T R_i \in \mathbb{R}^{6\times 3N_i}$ and $f=[f_1^T \ \ldots \ f_{N_C}^T]^T=[f_{1,1}^T \ \ldots \ f_{i,j}^T \ \ldots \ f_{N_C,N_{N_C}}^T]^T \in \mathbb{R}^{3\Sigma_{i=1}^{N_c}N_i}$. The right-hand side of Eq. (13) gives the wrench that is applied to floating base by the contact forces.

The desired joint acceleration $\hat{\ddot{q}}$ given by Eq. (8) may not be feasible due to the limitation of contact forces. In other words, after replacing $\ddot{q}$ with $\hat{\ddot{q}}$ in Eq. (13), there may not exist contact forces $f_{i,j} \in F_{i,j}$ that satisfy Eq. (13). In order to obtain joint accelerations that are as close as possible to $\hat{\ddot{q}}$, an optimization problem is formulated to compute the contact forces $f_{i,j}$ described by:

$$\begin{cases} \text{minimize} & \|M_1\hat{\ddot{q}} + c_1 - Gf\|^2 \\ \text{subject to} & f_{i,j} \in F_{i,j} \text{ for } \forall i \text{ and } j \end{cases} \qquad \text{Eq. (14)}$$

where $\|\cdot\|$ denotes the Euclidean norm. The problem of Eq. (14) has the following geometric meaning Let V be the set of all wrenches that can be applied to the floating base by the contact forces satisfying the friction constraint, i.e., $V=\{Gf \in \mathbb{R}^6 | f_{i,j} \in F_{i,j}$ for $\forall i$ and $j$. Geometrically, each friction cone $F_{i,j}$ given by Eq. (7) is a convex cone. Then, it can be proved that the set V is a convex cone in $\mathbb{R}^6$. The optimization provided by Eq. (14) involves computing the minimum Euclidean distance between V and $M_1\ddot{q}+c_1$ in $\mathbb{R}^6$, which can be calculated, for example by the algorithm described in Y. Zheng and C. M. Chew, "Distance between a point and a convex cone in n-dimensional space: computation and applications," *IEEE Transactions on Robotics*, Vol. 25, No. 6, pp. 1397-1412, 2009, which is incorporated by reference herein. Also, Eq. (14) is a quadratic program with second-order cone constraints for which a number of efficient algorithms are readily available to those skilled in the art. After solving Eq. (14) for the optimized contact forces, f*, the corresponding contact wrenches, w*, can be computed using Eq. (6).

Now, with regard to Step 2 or computing joint torques (as may be performed by the joint torque module of a tracking controller, after computing and substituting the optimized contact forces, f* the joint torques τ are determined such as by using or based on the following quadratic program:

$$\begin{cases} \text{minimize} & \frac{1}{2}(\ddot{q}-\hat{\ddot{q}})^T W_q (\ddot{q}-\hat{\ddot{q}}) + \frac{1}{2}\tau^T W_\tau \tau \\ \text{subject to} & M\ddot{q} - N^T \tau = J^T w^* - c, \\ & J_i \ddot{q} = \ddot{r}_i - \dot{J}_i \dot{q} \text{ for } \forall i \end{cases} \qquad \text{Eq. (15)}$$

where $\ddot{q}$ and τ are the $N_V=N_G+N_J$ unknown variables that need to be determined. The cost function comprises the error from the desired joint accelerations and the magnitude of joint torques. The first constraint is the full-body motion, Eq. (1), of the robot, from which $N_G$ linear equality constraints are obtained. After considering the full-body dynamics, therefore, $N_J$ variables among $\ddot{q}$ and τ are free, which leaves one the freedom to choose or optimize the joint torques for realizing the desired full-body motion. Also, this allows one to add the second constraint, which requires that joint accelerations, $\ddot{q}$, and the desired contact link accelerations, $\ddot{r}_i$, to satisfy the relation (5), as long as $6N_C \leq N_J$. If $6N_C > N_J$, then the Eq. (15) will be overdetermined and may not have a feasible solution. In that case, the second constraint can be converted to a penalty term and added to the cost function. Furthermore, when a contact candidate link is in the air, the second constraint for the link may be omitted because there is no longer a constraint to its motion.

The torque limit may be dealt with by adding it as a penalty term in the cost function of Eq. (15) rather than as inequality constraints, so that Eq. (15) is a quadratic optimization problem with only linear equality constraints. Further, a closed-form solution can be derived. We give the derivation for the case of $6N_C \leq N_J$ can be given as follows, while that for the case of $6N_C > N_J$ is similar. The cost function of Eq. (15) can be rewritten as ½ $(x-\hat{x})^T W (x-\hat{x})$, where $x=[\ddot{q}^T \tau^T]^T \in \mathbb{R}^{N_v}$, $\hat{x}=[\hat{\ddot{q}}^T \ 0]^T \in \mathbb{R}^{N_v}$, and $W=\text{diag}(W_q, W_\tau) \in \mathbb{R}^{N_v \times N_v}$. Also, the constraints of Eq. (15) can be integrated as the following linear equations:

$$Ax=b \qquad \text{Eq. (16)}$$

where $$A = \begin{bmatrix} M & -M \\ J & O \end{bmatrix} \in \mathbb{R}^{(N_G+6N_C)\times N_V}$$

$$b = \begin{bmatrix} J^T w^* - c \\ \ddot{r}_1 - \dot{J}_1 \dot{q} \\ \vdots \\ \ddot{r}_{N_C} - \dot{J}_{N_C} \dot{q} \end{bmatrix} \in \mathbb{R}^{N_G+6N_C}$$

Let $y=W^{\frac{1}{2}}(x-\hat{x})$. Then, the cost function of Eq. (15) can be further reduced to ½$y^T y$ and:

$$x=W^{-\frac{1}{2}}y+\hat{x} \qquad \text{Eq. (17)}$$

Substituting (17) into (16) yields:

$$AW^{-\frac{1}{2}}y=b-A\hat{x} \qquad \text{Eq. (18)}$$

Then, the optimal value of y that satisfies Eq. (18) and minimizes ½$y^T y$ can be calculated by:

$$y^*=W^{\frac{1}{2}}A^T(AW^{-1}A^T)^{-1}(b-A\hat{x}) \qquad \text{Eq. (19)}$$

Substituting Eq. (19) into Eq. (17), the closed-form solution to Eq. (15) is obtained as:

$$x^*=W^{-1}A^T(AW^{-1}A^T)^{-1}(b-A\hat{x})+\hat{x} \qquad \text{Eq. (20)}$$

The above-described tracking controller was tested through a number of simulations with a floating-base humanoid robot. Particularly, the simulation setup involved use of a dynamics simulator with a rigid-contact model to conduct experiments (e.g., a simulator similar to that developed by the University of Tokyo as discussed in K. Yamane and Y. Nakamura, "A numerically robust LCP solver for simulating articulated rigid bodies in contact," in *Robotics: Science and Systems*, 2008, which is incorporated herein by reference). The humanoid robot model used in the simulations had 25 joints and 31 DOFs including the translation and rotation of the floating base. Each leg had 7 joints (pitch, roll, yaw at both the hip and the ankle and pitch at the knee). Only the 4 joints in each arm were considered (pitch, roll, yaw at the shoulder, and pitch at the elbow) and the wrist joints were fixed. There were 3 joints in the torso of the robot model. The robot model was about 1.7 meters tall and was 65 kg in weight.

The controller was implemented in C++ on a laptop with an Intel Core i7, 2.67 GHz CPU and 3 GB RAM. Average computation times of the whole controller in the following examples were in the range of 1.48 to 1.61 msec, which was fast enough to provide real-time control at 500 Hz. Contact force and joint torque optimizations took approximately 24 to 26 percent and 31 to 33 percent of the computation time, respectively. The rest of the time is spent for computing the other quantities such as the desired accelerations, the mass matrix, and the Jacobian matrices.

Figure 5A:
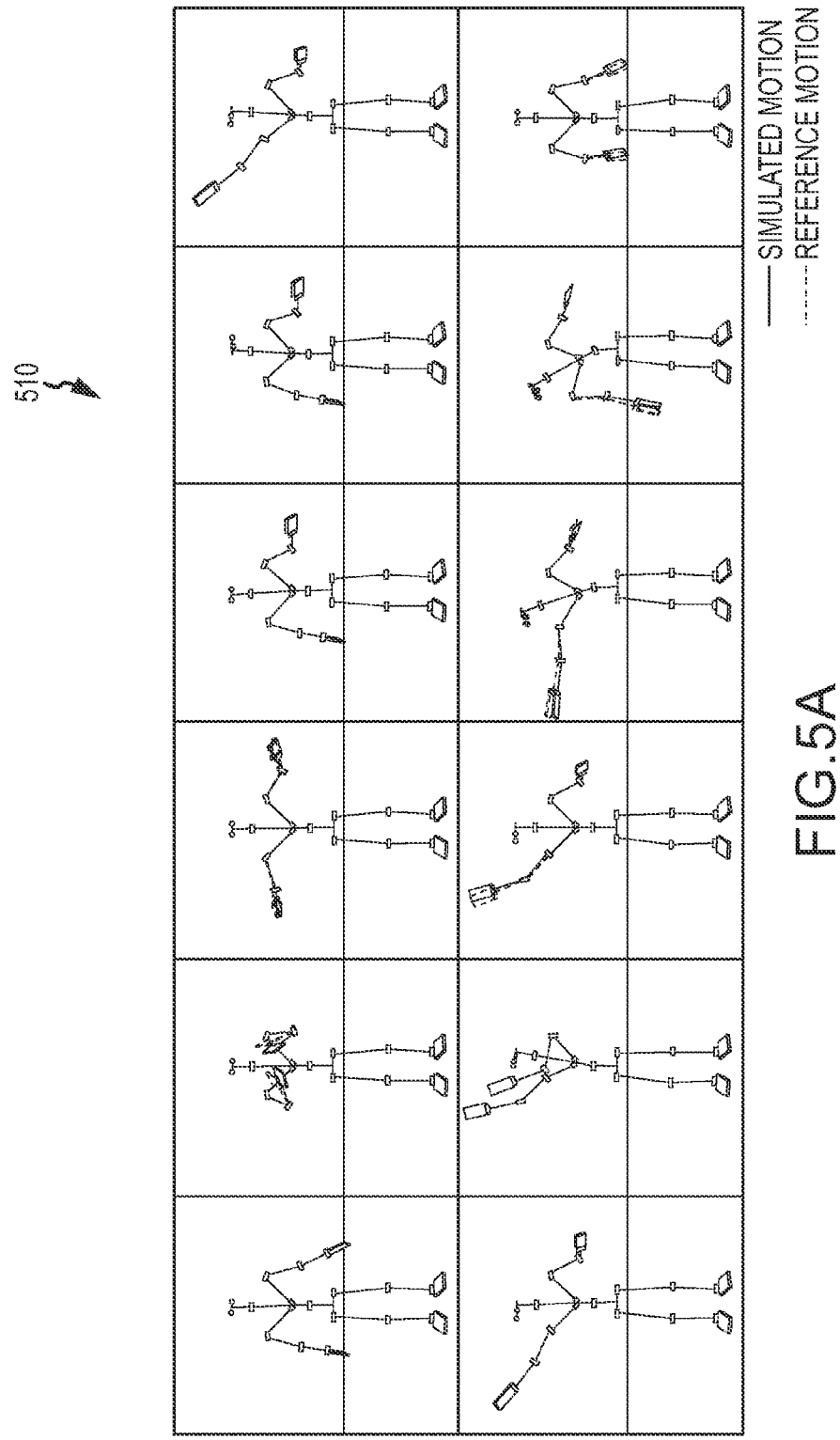
FIGS. 5A and 5B show with sets of graphic screen shots, respectively, the simulated motions of a robot controlled according to the present description (i.e., with a tracking controller implementing strict contact constraints and using the decoupled optimization steps as shown in FIGS. 1 and 2).
Figure 5B:
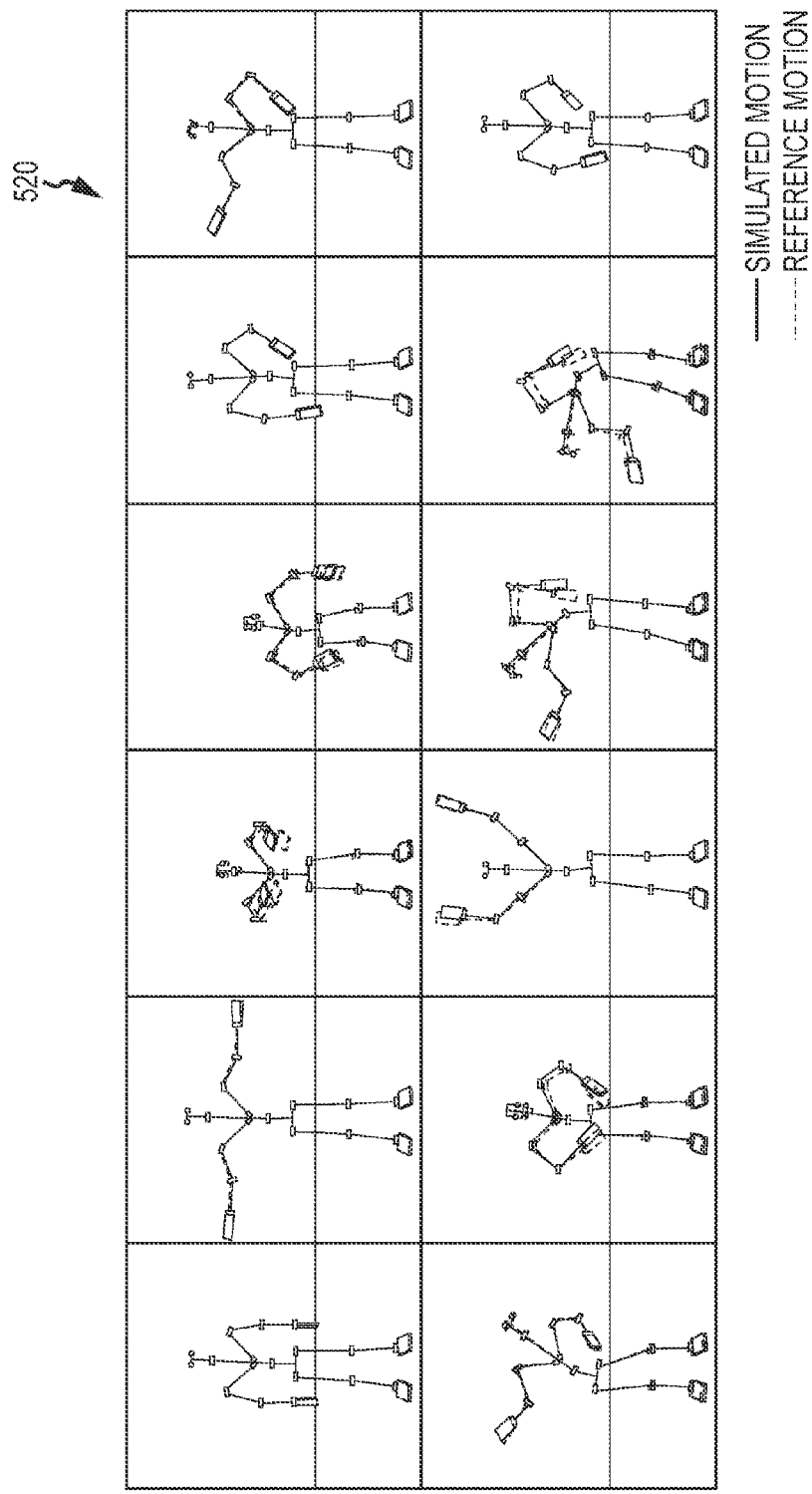

With regard to tracking human motion without contact state change, in this example, the robot was simulated to provide control that tracks two different motion capture clips. The clips were chosen from the CMU Motion Capture Data Library (which at the time of simulation was available at http://mocap.cs.cmu.edu/), where two different actors performed movements associated with the nursery rhyme "I'm A Little Teapot" while maintaining their feet on the ground. While the actors' captured motions are not shown, FIGS. 5A and 5B show with sets of graphic screen shots 510 and 520, respectively, the simulated motions of a robot controlled according to the present description (i.e., with a tracking controller implementing strict contact constraints and using the decoupled optimization steps as shown in FIGS. 1 and 2).

The simulation shots 510, 520 show or demonstrate that the proposed tracking controller enables the robot to reproduce the two differing human motions (processing two sets of human motion capture data) without falling. The contact forces and moments on the left foot computed by the tracking controller and the simulated values were plotted for the simulation presented in FIG. 5B. The plots (not presented herein) showed that the two values matched very well in all six components. The simulation shots 510, 520 showed that there could be a difference in tracking fidelity with differing human motion capture data, and this may be due to the different styles of motion even when two actors try to perform the "same" set of movements.

In the simulated examples, the first actor (set 510 of FIG. 5A) was slower and smoother such that the robot model was better able to track the motion more accurately. The second actor (set 520 of FIG. 5B) the actor made more rapid and jerky movements, and the robot's pose was significantly different from the modeled subject/actor (e.g., the robot could not perform the exact duplicate of the actor's movements because, in this case, the actor was smaller and lighter than the robot model such that the robot could not accurately follow the actor's captured motion without unacceptably large torques (e.g., torques exceeding constraints of the model)).

Figure 4:
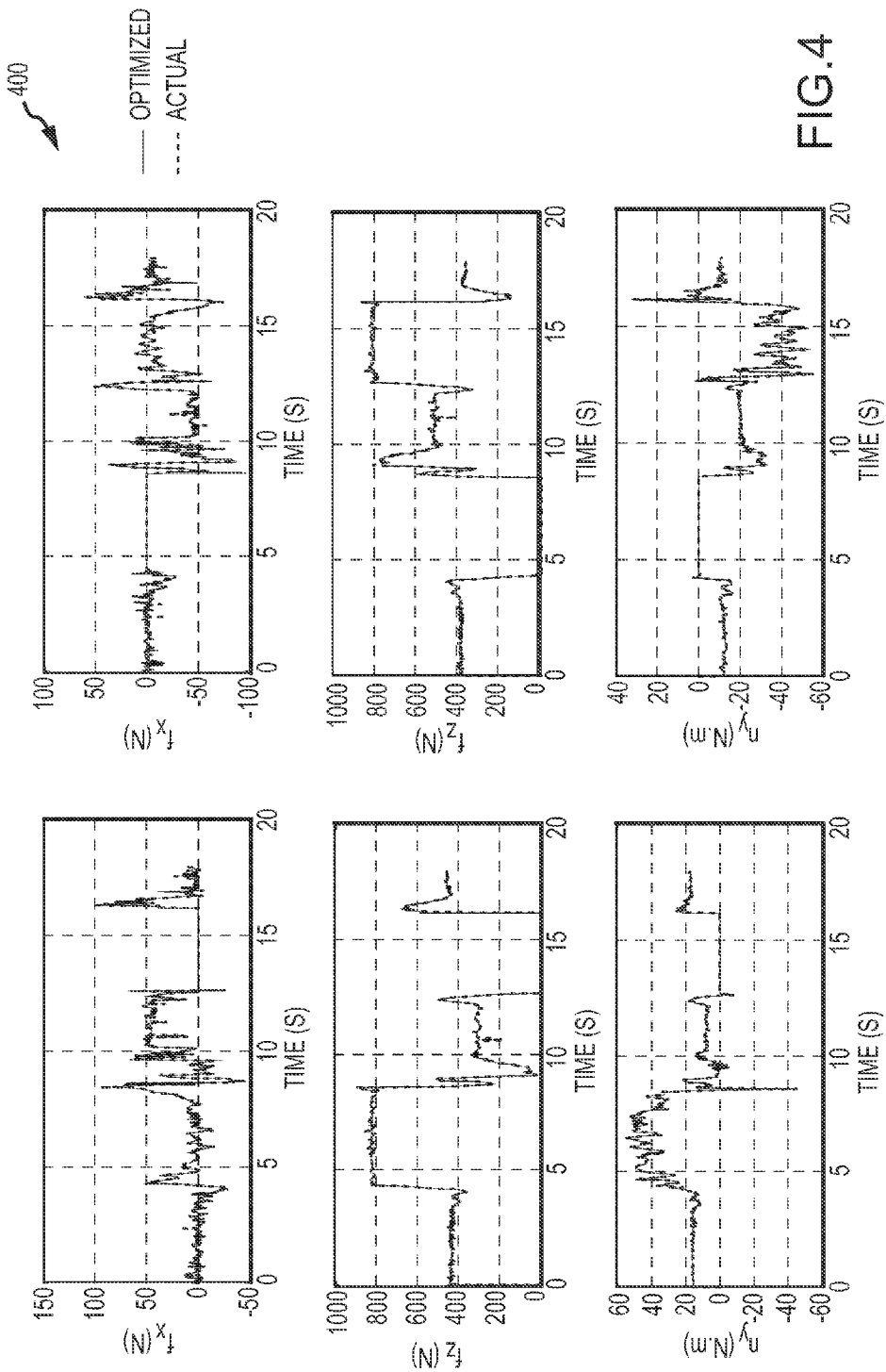
FIG. 4 provides graphs of optimized and actual values (with solid and dashed lines) on both feet during one exemplary floating-base robot control simulation.

In another simulation, the robot was controlled with a tracking controller to follow a human's stepping motions. The simulated robot motions (not shown) showed that the robot model can preserve the style of the original human motions. As a side stepping motion is performed in the xz plane of the global frame, the contact forces in the x-direction and in the z-direction and the moment in the y-direction on the feet play a decisive role in the motion. The graphs 400 in FIG. 4 exhibit the optimized and actual values (with solid and dashed lines) on both feet during this simulation. In the graphs 400, it is difficult in many cases to identify two different lines as the optimized and actual values were closely correlated (or matched for a significant amount of the time) using the tracking controller taught herein.

The inventors also recognized that a tracking controller may be provided that is adapted to prevent falling due to extreme reference motions (e.g., human motion capture data that includes movements that will cause the particular controller robot to fall on the particular terrain/support surface). Only considering the contact force constraints does not generally guarantee that a robot will not tip over, especially if the reference motion is extremely difficult to track. A simple example is trying to maintain a stationary pose where the center of mass (COM) projection is outside of the contact area. In this case, the tracking controller could result in a falling motion with COP in the contact area. This issue is not unique to the described tracking controller but applies to any real-time controller for interactive floating-base robots because one cannot predict future reference motion.

One solution to this issue is to switch or interpolate between two or more reference motions. One is chosen because it is a "safe" reference, such as maintaining a static equilibrium pose. The inventors demonstrated this concept with a simple example using the described tracking controller. The main reference motion was a static pose that is not a static equilibrium for the robot's mass distribution. Tracking motion will eventually cause the robot to fall. Therefore, another reference motion was used that was maintaining a static equilibrium pose (and this may also be the initial pose for a simulation).

In this example, the controller interpolated between the two motions with weights determined by the time at which the COM is expected to reach the support area boundary computed based on the current position and velocity of the COM. The shorter the time is, the larger the weight for the static equilibrium motion. If the time is below a threshold, the reference pose is switched completely to the static equilibrium one to prevent the robot from falling. In the simulation, the robot finally reached and maintained a pose that was between the two reference poses, and the final COP was at the edge of the support area (toe).

In this description, a controller for humanoid robots has been presented that tracks motion capture data. Given the desired accelerations at all DOF to track the reference motion, the proposed tracking controller computed the optimal joint torques and contact forces to realize the desired accelerations considering the full-body dynamics of the robot and the constraints on the contact forces. The simulation results obtained by the inventors for the tracking controller used with a robot model showed that the tracking controller can successfully make a humanoid robot track various human motions. The tracking controller can be adapted to prevent a robot from falling when an extreme motion is given as the reference (as part of the input motion capture data).

The inventors further understand that their teaching may be extended in a number of differing directions. For example, the tracking control method may be extended to motions involving contacts at hands or other links in addition to the feet of a humanoid robot. This will allow humanoid robots to track a much larger range of human motions. Another potentially useful extension is to motions with more complex contact states and contact link motions. For example, the formulation for a tracking controller may be extended to sliding contacts, where the contact force may be restricted to the boundary of the friction cone and opposite to the sliding direction.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

This description has presented a tracking controller considering force constraints for floating-base humanoid robots. One goal of the tracking controller design was to provide a controller that computes the joint torques such that the robot can imitate given or input reference motions obtained from, for example, human motion capture data. One technical challenge addressed with the design of the tracking controller is that the robot motion depends not only on joint torques but also on contact forces from the environment, which depend on the joint torques and are subject to constraints on friction forces.

Therefore, computing the joint torques and associated contact forces typically results in a nonlinear optimization problem with complex constraints. The tracking controller solves or addresses this issue by taking advantage of the property that the motion of the floating base is only affected by contact forces. With this understanding, the contact forces and joint torques can be separately computed by solving two simple sequential optimization problems. Through dynamic simulations, the description discussed the inventors' demonstration that the proposed tracking controller can be implemented so as to successfully enable a humanoid robot to be controlled to reproduce different human motions, including motions with contact state changes.

Prior approaches of controlling humanoid robots that tried to use human motion data as input involved extensive preprocessing of the motion data. Often, this preprocessing involved optimization to obtain a reference motion that is similar to the human motion and that is feasible/practically performable for the particular controlled robot and its design of components. Therefore, these approaches are not useful for real-time control of humanoid robots. Other approaches failed to enforce the constraints on contact forces and contact link motions so that the optimization problem had a closed-form solution and could be solved in real time. However, while the probability of obtaining a feasible solution can be increased by adjusting the weights of the cost function terms in such approaches, there is no guarantee that the resulting contact forces will satisfy the constraints. Therefore, the resulting joint torques may cause foot rotation (or other problematic movements) and make the robot fall (lose its balance). In addition, these methods cannot be applied to robots that move on uneven terrain because the balance control is based on the concept of center of pressure that has to be defined on a common plane throughout the motion.

The described tracking control method provides a number of advantages over such prior control approaches. First, the tracking control method explicitly considers the constraints on contact forces and contact link motions so that the generated motions are guaranteed to be feasible or performable for the particular controlled robot. Directly solving this optimization problem is computationally expensive and may not be suitable for real-time control. However, decoupling the optimization problem into two less complex optimization problems/computations allows the optimization problem to be computed quickly enough for real-time applications. Second, the control method involves directly computing contact forces and their associated constraints based on contact locations for the controlled robot in a particular environment instead of based on the center of pressure. Thus, the tracking control method taught herein can be applied to the case where the robot stands or moves on uneven terrain (on a support that is not planar).

We claim:

1. A method for controlling a floating-base robot to track a reference motion, comprising:
    sensing the state of the floating-base robot with reference to an operating environment;
    with a processor, determining desired joint and contact link accelerations based on the reference motion and the state of the floating-base robot;
    with the processor, computing contact wrenches and joint torques to generate the desired joint and contact link accelerations;
    with the processor, controlling the floating-base robot to track the reference motion using the contact wrenches and joint torques from the computing step; and
    repeating the sensing of the state, the determining of desired joint and contact link accelerations, and the computing contact wrenches and joint torques for each control cycle for the floating-base robot.

2. The method of claim 1, wherein the desired joint and contact link accelerations are calculated by a feedback controller based on the reference motion and the state of the floating-base robot.

3. The method of claim 1, wherein contact wrenches and joint torques are computed separately by solving two sequential optimization problems.

4. The method of claim 3, wherein the joint torques are calculated based on the desired joint and contact link accelerations, the state of floating-base robot, and the computed contact wrenches.

5. The method of claim 1, wherein the contact wrenches and joint torques are computed based on the state and the full-body dynamics model of the floating-base robot.

6. The method of claim 1, wherein the contact wrenches are calculated based on the desired joint accelerations, desired contact states of contact links, and the state of the floating-base robot.

7. The method of claim 6, wherein the contact wrenches are calculated such that the contact force applied by the operating environment at each contact point satisfies the inequality constraints on the direction and magnitude of the contact force.

8. The method of claim 6, wherein the desired contact states change during the reference motion.

9. The method of claim 1, wherein the reference motion is human motion capture data.

10. The method of claim 1, wherein the reference motion is key frame animation.

11. A robot, comprising:
    a floating-base body comprising a plurality of links and torque-controlled joints; and
    a tracking controller comprising:
        sensing a state of the robot with reference to an operating environment;
        determining desired joint and contact link accelerations based on a reference motions and the state of the floating-base robot;
        computing contact wrenches and joint torques to generate the desired joint and contact link accelerations; and
        repeating the sensing of the state, the determining of desired joint and contact link accelerations, and the computing contact wrenches and joint torques for each control cycle for the robot.

12. The robot of claim 11, wherein the desired joint and contact link accelerations are calculated by a feedback controller based on the reference motion and the state of the floating-base body.

13. The robot of claim 11, wherein contact wrenches and joint torques are computed separately by solving two sequential optimization problems.

14. The robot of claim 13, wherein the joint torques are calculated based on the desired joint and contact link accelerations, the state of floating-base body, and the computed contact wrenches.

15. The robot of claim 11, wherein the contact wrenches and joint torques are computed based on the state and the full-body dynamics model of the floating-base body.

16. The robot of claim 11, wherein the contact wrenches are calculated based on the desired joint accelerations, desired contact states of contact links, and the state of the floating-base body.

17. The robot of claim 16, wherein the contact wrenches are calculated such that the contact force applied by the operating environment at each contact point satisfies the inequality constraints on the direction and magnitude of the contact force.

18. The robot of claim 16, wherein the desired contact states change during the reference motion.

19. The robot of claim 11, wherein the reference motion is human motion capture data.

20. The robot of claim 11, wherein the reference motion is key frame animation.

21. A method for controlling a floating-base robot to track a set of reference motions, comprising:

with a processor, sensing the state of the floating-base robot with reference to an operating environment;

with the processor, predicting the future state of the floating-base robot;

with the processor, interpolating the reference motions based on a predicted future state;

with a tracking controller provided by the processor, determining desired joint and contact link accelerations based on the interpolated reference motions and the state of the floating-base robot;

with the tracking controller, computing contact wrenches and joint torques to generate the desired joint and contact link accelerations;

controlling the floating-base robot to track the reference motions based on the contact wrenches and joint torques; and repeating the sensing of the state, the interpolating of the reference motions, the determining of desired joint and contact link accelerations, and the computing contact wrenches and joint torques for each control cycle for the floating-base robot.

22. The method of claim 21, wherein the set of reference motions comprises a motion that maintains a static equilibrium pose of the floating-base robot.

23. The method of claim 21, wherein the motions are interpolated based on the predicted center of mass position.

* * * * *